Figure 2:
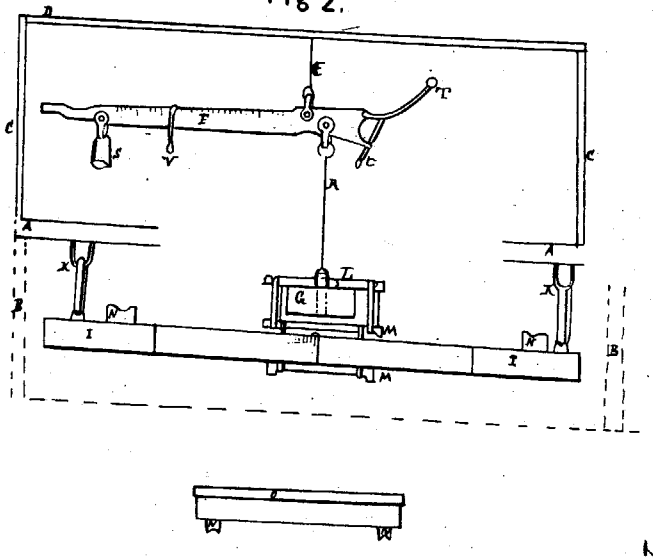
Figure 1:
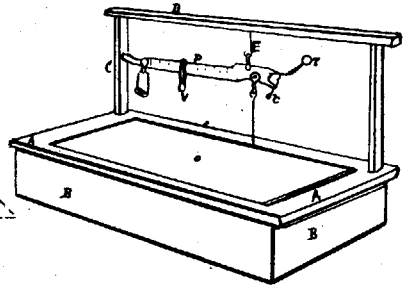
Figure 3:
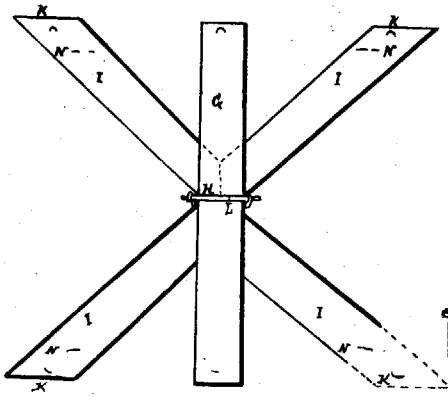
Figure 4:
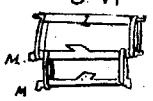

8847X

E. A. & A. Hibbard.

Platform Scales.

Patented May 29. 1835.

May 29. 1835

Elias A. Hibbard & Asa Hibbard Lunenburg Vermont

Letters Patent

The schedule referred to in these Letters Patent and making part of the same containing a description in the words of the said Elias A. Hibbard and Asa Hibbard themselves of their improvement in a double Beam Scale To all to whom these presents shall come Be it known that We Elias A. Hibbard and Asa Hibbard both of Lunenburg in the County of Essex in the State of Vermont have invented a new and useful improved double Beam Scale and that the following is a full and exact description thereof it being an improved double Beam Scale described as follows. Four pieces of timber are framed together in a square form and laid on a wall on one side of the square are two posts set up framed to the timber of the square with a cap extending from one post to the other to form a weigh box a hook extending downward from the cap nearly above the centre of the square supports the steel yard or beam of the scales a lever is suspended directly across the centre of said square underneath it one end of which lever is fastened to said steel yard or beam by a staple and an iron rod the other end of said lever is hung to the centre of that side of the square opposite the said weigh box by two staples one of which has a point bearing said lever is divided into two equal parts by a point at an equal distance between the points of bearing upon which said lever hangs at each end which point is the common centre of the scales under the above described lever are four other levers which are framed together in pairs composing two angles the points of which two angles are placed together directly under said centre of said first described lever. The arms of one pair of said angular levers run directly under the two corners of the above described square on the side opposite to said weigh box the arms of the other pair of said angular levers run directly under the c[illegible]ners of said square nearest to said weigh box the ends of each of the arms of said angular levers are hung to said corners of said square by two staples and a link at each corner one of which staples passes through the corner of said square and the other through the arm of the angular lever near the end; the link con-
-nects the two Staples together by going into each, said staples have pivot bea-
-rings at the points where they rest upon the links said links are of suf-
-ficient length to hang said angular levers so low beneath said first
X described lever (as to admit of room for said first described lever) to act
between said angular levers and the timbers of said square said first
described lever has an iron bolted on to the top of it at the above descri-
-bed centre thereof which iron runs across it and projects out each side of the
lever with pivot bearings, One iron similar in shape to the capital letter
T is bolted to the under side of the angle of one of said pair of levers above describe
in such a manner that two ends of said iron project out each way from the
point of said angle which projecting parts of said iron have pivot bearings
upon the under side of them another iron similar in shape to the one last
described is bolted on to the top of the angle of the other pair of said levers with the ends
projecting each way from the end of said last mentioned angle the pro-
-jecting parts of which last mentioned iron have pivot bearings upon the
upper side of them directly over the bearings on the iron on said first men-
-tioned angular levers two links are placed one on each side of the angles
which links connect the bearings on the iron fastened as aforesaid to the
upper side of one angle to the bearings on the iron fastened as above described to
the underside of the other angle. The iron fastened as above described upon
the upper side of one of said angles extends each way from the end of the angle
further than the iron on the under side of the other angle, and has pivot
bearings upon the under side of it directly under the bearings upon the
iron bolted as above described across the centre of the first described lever and
said last described bearings upon said iron on the top of said angle are
connected by two links with said bearings on said cross iron. Each arm of each
angular lever is divided into five equal parts one part from the staple at
the corner of the square by which the ends of the angular levers are suspended
to the dividing point (and four parts from the dividing point to the corner of the
angle, at the dividing point of the arms of each of said angular levers being
brought to a [illegible] are bolted to the tops of said arms in which are placed
[illegible] [illegible] [illegible] [illegible] [illegible] which are attached to

[illegible] [illegible] Composing the platform of the Scale and said posts are long enough to raise the timbers of the platform above the beam of the Scale said posts to support the whole platform and whatever is placed upon it. The platform is a square and placed within the first mentioned square leaving a small space all round the platform between that and the timbers of the square to prevent friction.

The Steel yard or beam has three pairs of pivot bearings one by which it is suspended from the hook and one to which the weigh rod is attached and another from which a Counterpoise is suspended, the bearings to which the weigh rod is attached are near one end of the beam and the bearings from which the Counterpoise is suspended are near the end of the beam and the bearings by which the beam is suspended are between them. The distance from the bearings (sustaining the Counterpoise to the bearings sustaining) the beam is ten times the distance [illegible] [illegible] from the bearings sustaining the beam to the bearings to which the weigh rod is attached. Said Counterpoise is a cast iron disk with a bale to suspend it from the pivots into which disk sufficient weight is put to balance the platform. At the end nearest the weigh rod a small rod is fastened to the beam like a hinge to the other end of which rod a ball is fastened a screw acting against said rod raises or lowers the same and the ball on the [illegible] so as to give the Scale an exact balance.

The power gained by said Scale is one thousand fold that is one pound put into the Counterpoise disk will exactly balance one hundred pounds placed upon the platform. A poise is added to move upon the beam to give the odd pounds, said beam is graduated and marked with figures like a pair of common Steel yards. The Scale is to be balanced with the poise over a Cypher on the beam. What we mean to claim as [illegible] invention and not previously known is the above described [illegible] [illegible] [illegible] suspended directly over the centre of said Square [illegible] [illegible] one end of which lever is fastened to said Steel yard or beam by a [illegible] [illegible] iron rod the other end of which said lever is hung to [illegible] [illegible] the sides of the square opposite to said weigh beam by two Staples [illegible] [illegible] [illegible] pivot bearing which divide lever [illegible] into two equal [illegible] [illegible] [illegible] [illegible] [illegible] between the pivots of bearing [illegible]

which said lever hangs at each end said a point being the common centre
of the scale also said four other levers which are framed together in pairs
comprising two angles the points of which two angles are placed together direct-
-ly under said centre of said first described lever the arms of one of which
pair of angular levers run directly under the two corners of the above described
square on the side opposite to said weigh box the arms to the other of which
pair of angular levers run directly under the corners of said square near-
-est to said weigh box the ends of each of the arms of which angular levers
are hung to said corners of said square by two staples and a link at each
corner one of which staples passes through the corner of said square and the
other through the arm of the angular lever near the end which said link
connects the two staples together by passing into each which said staples have
pivot bearings at the points where they rest upon said links; and which
said links are of sufficient length to hang said angular levers so low
beneath said first described lever as to admit of room for said first de-
-scribed lever to act between said angular levers and the timbers of said
square said first described lever has an iron bolted on to the top of it at
the above described [illegible] which iron runs across it and projects out each
side of the lever without pivot bearings. An Iron similar in shape to the
Capital letter "T" is bolted to the under side of the angle of one of said pair
of levers above described in such a manner that two ends of said iron pro-
-ject out each way from the point of said angle which projecting part of
said irons have pivot bearings upon the under side of them another iron
similar in shape to the one last described is bolted to the top of the angle of the
other pair of said levers with two ends projecting each way from the end
of said last mentioned angle the projecting parts of which last mentio-
-ned iron have pivot bearings upon the upper side of them directly over the
bearings on the iron on said first mentioned angular levers two links
are placed on each side of said angles which links connect the bearings
on the iron fastened as above described to the upper side of one angle to the
bearings on the iron fastened as aforesaid to the under side of the other an-
-gle. The iron fastened as above described upon the upper side of one of said
angles extends each way from the end of the angle farther than the

[illegible] under side of the other angle and has pivot bearings on the under side of it directly under the bearings on the iron bolted as above [illegible] [illegible] the centre of the first mentioned beam and said last [illegible] bearings upon said iron on the top of said angle are connected by [illegible] with said bearings on said cap iron each arm of each angular beam is divided into five equal parts one part from the staple at the corner of the square by which the ends of the angular beams are suspended to the dividing point and four parts from the dividing point to the corner of the angle at the dividing point of the arms of each of said angular beams [illegible] brought to a pivot are bolted to the tops of said arms on which are placed four iron posts made circularly concave at the lower end which are attached to the timbers composing the platform of the scale which posts are long enough to raise the timbers of the platform above the beams of the scale and which posts support the whole platform and whatever is placed upon it. Also at the end nearest to the weigh rod is a small rod fastened to one end of the beam like a hinge, to the other end of which rod is a ball a screw acting against said rod raises and lowers said rod and the ball on the end of it so as to give the scale an exact balance.

The following described interlineations and erasures were made in the foregoing specification before signing to wit the word "side" on the first page between the 22 and 23 line from the top also the word "[illegible]" between the 23 and 24 line from top also the word [illegible] between the 27 and 28 line from top also the word "iron" between the 37th and 38 line from top also the word "one" between the 44 & 45 line from top on page 2 line 11 from top word "the" erased on the same page between the 15 and 16th line from top the word "posts" is written over an erasure in the 16 line also the word "the" between the 27 & 28 line from top is interlined Asa Hibbard
Elias A Hibbard Witnesses
William Heywood Jr } to Asa Hibbard
[illegible] Heywood }
[illegible] [illegible] } to Elias A Hibbard
[illegible] [illegible] }

[illegible]